United States Patent
Chhabra et al.

(10) Patent No.: US 9,992,102 B2
(45) Date of Patent: Jun. 5, 2018

(54) METHODS AND SYSTEMS TO SELECT ACTIVE AND STANDBY PORTS IN LINK AGGREGATION GROUPS

(71) Applicant: Ciena Corporation, Hanover, MD (US)

(72) Inventors: Mukesh Chhabra, New Delhi (IN); Manish Tahiliani, Lucknow (IN); Atul Mehra, Gurgaon (IN)

(73) Assignee: Ciena Corporation, Hanover, MD (US)

( * ) Notice: Subject to any disclaimer, the term of this patent is extended or adjusted under 35 U.S.C. 154(b) by 221 days.

(21) Appl. No.: 14/879,139

(22) Filed: Oct. 9, 2015

(65) Prior Publication Data

US 2017/0063672 A1    Mar. 2, 2017

(51) Int. Cl.
*H04L 12/703* (2013.01)
*H04L 12/709* (2013.01)
*H04L 12/24* (2006.01)

(52) U.S. Cl.
CPC .......... *H04L 45/28* (2013.01); *H04L 41/0816* (2013.01); *H04L 41/0886* (2013.01); *H04L 45/245* (2013.01); *Y02D 50/30* (2018.01)

(58) Field of Classification Search
CPC ......... H04L 45/00; H04L 45/22; H04L 45/28; H04L 12/42
See application file for complete search history.

(56) References Cited

U.S. PATENT DOCUMENTS

| 7,414,985 | B1 | 8/2008 | Tedijanto et al. |
| 8,948,175 | B2 | 2/2015 | Bly et al. |
| 2009/0109998 | A1* | 4/2009 | Vinayagam ............. H04L 49/30 370/465 |
| 2009/0201909 | A1* | 8/2009 | Bou-Diab ............... H04L 45/00 370/351 |
| 2009/0232152 | A1* | 9/2009 | Chen ....................... H04L 12/42 370/419 |
| 2010/0157793 | A1* | 6/2010 | Sajassi ................ G06F 11/2007 370/228 |
| 2010/0238791 | A1* | 9/2010 | Duncan ............... H04L 12/4633 370/216 |
| 2010/0290472 | A1* | 11/2010 | Raman .................... H04L 45/00 370/395.2 |
| 2011/0258346 | A1* | 10/2011 | Said ........................ H04L 45/00 709/249 |

(Continued)

OTHER PUBLICATIONS

"Link Aggregation" IEEE Computer Society, Nov. 3, 2008, pp. 1-163.

(Continued)

*Primary Examiner* — Edan Orgad
*Assistant Examiner* — Emmanuel Maglo
(74) *Attorney, Agent, or Firm* — Clements Bernard Walker PLLC; Christopher L. Bernard; Lawrence A. Baratta, Jr.

(57) ABSTRACT

Systems and methods for automatically selecting active ports and standby ports in a Link Aggregation Group (LAG) or a Multi-Chassis LAG (MC-LAG) between a first node and a second node are described. The systems and methods include receiving a configuration associated with the LAG or the MC-LAG; automatically determining a port status for each of a plurality of ports based on the configuration; and communicating the determined port status for each of the plurality of ports between the first node and the second node.

13 Claims, 13 Drawing Sheets

(56) References Cited

U.S. PATENT DOCUMENTS

| | | | |
|---|---|---|---|
| 2012/0113835 A1* | 5/2012 | Alon | H04L 43/0817 370/252 |
| 2013/0028080 A1* | 1/2013 | Rao | H04L 47/6215 370/230 |
| 2013/0148512 A1* | 6/2013 | Sarwar | H04L 41/042 370/252 |
| 2014/0025736 A1* | 1/2014 | Wang | H04L 45/46 709/204 |
| 2014/0071825 A1 | 3/2014 | Chhabra et al. | |
| 2014/0247829 A1 | 9/2014 | Gautam et al. | |
| 2014/0341012 A1* | 11/2014 | Holness | H04L 45/28 370/225 |
| 2015/0188780 A1* | 7/2015 | Spieser | H04L 41/5009 370/252 |
| 2016/0094394 A1* | 3/2016 | Sharma | H04L 41/0806 709/223 |

OTHER PUBLICATIONS

"Link Aggregation" IEEE Computer Society, pp. 1-344.
"Link Aggregation according to IEEE Standard 802.3ad," SysKonnect, pp. 1-22.

* cited by examiner

METHODS AND SYSTEMS TO SELECT ACTIVE AND STANDBY PORTS IN LINK AGGREGATION GROUPS

CROSS-REFERENCE TO RELATED APPLICATION(S)

The present patent application/patent claims the benefit of priority of Indian Patent Application No. 2682/DEL/2015, filed on Aug. 28, 2015, and entitled "METHODS AND SYSTEMS TO SELECT ACTIVE AND STANDBY PORTS IN LINK AGGREGATION GROUPS," the contents of which are incorporated in full by reference herein.

FIELD OF THE DISCLOSURE

The present disclosure generally relates to networking systems and methods. More particularly, the present disclosure relates to methods and systems to select active and protection ports in Link Aggregation Groups (LAGs).

BACKGROUND OF THE DISCLOSURE

Link aggregation relates to combining various network connections in parallel to increase throughput, beyond what a single connection could sustain, and to provide redundancy between the links. Link aggregation including the Link Aggregation Control Protocol (LACP) for Ethernet is defined in IEEE 802.1AX, IEEE 802.1aq, IEEE 802.3ad, as well as various proprietary solutions. IEEE 802.1AX-2008 and IEEE 802.1AX-2014 is entitled Link Aggregation, the contents of which are incorporated by reference. IEEE 802.1aq-2012 is entitled in Shortest Path Bridging, the contents of which are incorporated by reference. IEEE 802.3ad-2000 is entitled Link Aggregation, the contents of which are incorporated by reference. In conventional implementations of Link Aggregation, to set up protection, a user specifically specifies which port to add as a standby port in a LAG. Based on the user input, the configured port will either act as a standby port or an active port. The active ports would distribute traffic to the far end while the standby ports do not distribute traffic. This conventional implementation is complex; a user has to look for end-to-end connectivity of ports between two switches and configure standby and active ports accordingly at both the switches. This can lead to misconfigured active-standby ports at either end as the user might not be aware of active-standby configuration at the far end of the switch. The misconfiguration leads traffic loss at both ends of link aggregation because wrong active and stand-by ports could be connected to one another.

BRIEF SUMMARY OF THE DISCLOSURE

In an exemplary embodiment, a method is described for automatically selecting active ports and standby ports in a Link Aggregation Group (LAG) or a Multi-Chassis LAG (MC-LAG) between a first node and a second node. The method includes receiving a configuration associated with the LAG or the MC-LAG; automatically determining a port status for each of a plurality of ports based on the configuration; and communicating the determined port status for each of the plurality of ports between the first node and the second node. The configuration can include one of (i) a specification of a number of preferred ports for the plurality of ports and (ii) a specification of preferred links and standby links. The automatically determining can assign an active status and a standby status to each of the plurality of ports based on the configuration, wherein one of the first node and the second node are determined as a master node which performs the automatically determining and communicates to a slave node. The communicating can utilize a Link Aggregation Control Protocol (LACP). The communicating can utilize reserved bytes in a Protocol Data Unit (PDU) from LACP. The communicating can utilize a state machine in which the first node and the second node communicate associated port states for each of the plurality of ports. The communicating ensures each pair of ports of the plurality of ports is in a same state. The method can further include, responsive to a fault on an active port of the plurality of ports, selecting another port by a master switch to switch traffic to from the active port; and communicating an update of status of the another port to a slave switch. The method can further include, responsive to the fault being restored, reverting to the active port and communicating an update of status of the active port to the slave switch.

In another exemplary embodiment, a switch is configured to automatically select active ports and standby ports in a Link Aggregation Group (LAG) or a Multi-Chassis LAG (MC-LAG) between a second switch. The switch includes a plurality of ports; circuitry configured to, responsive to receipt of a configuration associated with the LAG or the MC-LAG, automatically determine a port status for each of a plurality of ports based on the configuration; and circuitry configured to communicate the determined port status for each of the plurality of ports between the first node and the second node. The configuration can include one of (i) a specification of a number of preferred ports for the plurality of ports and (ii) a specification of preferred links and standby links. The circuitry configured to automatically determine can assign an active status and a standby status to each of the plurality of ports based on the configuration, wherein the switch is a master node which determines the active status and the standby status and communicates with a slave node which is the second switch. The circuitry configured to communicate can utilize a Link Aggregation Control Protocol (LACP). The circuitry configured to communicate can utilize reserved bytes in a Protocol Data Unit (PDU) from LACP. The circuitry configured to communicate can utilize a state machine in which the switch communicate associated port states for each of the plurality of ports to the second switch. The circuitry configured to communicate ensures each pair of ports of the plurality of ports are in a same state at both the switch and the second switch. The switch can further include circuitry configured to, responsive to a fault on an active port of the plurality of ports, select another port by a master switch to switch traffic to from the active port; wherein the circuitry configured to communicate is configured to an update of status of the another port to a slave switch. The circuitry configured to select another port can be configured to, responsive to the fault being restored, revert to the active port and communicating an update of status of the active port to the slave switch.

In a further exemplary embodiment, a network is described in which active ports and standby ports in a Link Aggregation Group (LAG) or a Multi-Chassis LAG (MC-LAG) are automatically configured between switches. The network includes a first switch including a first plurality of ports; a second switch including a second plurality of ports communicatively coupled to the first plurality of ports; wherein one of the LAG and the MC-LAG is configured over the first plurality of ports and the second plurality of ports; wherein one of the first switch and the second switch is a master switch that includes: circuitry configured to, responsive to receipt of a configuration associated with the LAG or the MC-LAG, automatically determine a port status for each of port based on the configuration; and circuitry configured to communicate the determined port status to a slave switch. The first switch and the second switch can utilize Link Aggregation Control Protocol (LACP).

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Again, in various exemplary embodiments, the present disclosure relates to methods and systems to select active and protection ports in Link Aggregation Groups (LAGs). The state machines in the LACP, such as specified in IEEE 802.3ad, are enhanced to determine automatically active and standby ports with minimum traffic impact. For example, reserved bytes in the LACP Protocol Data Unit (PDU) structure are utilized to propagate and determine the number of active member ports of Link aggregation. Advantageously, network administrators are not required to configure active and standby ports or any other information during configuration. The methods and systems are also capable of detecting a misconfiguration and selecting an appropriate number of ports that shall be Active in Link Aggregation or multi-chassis Link Aggregation.

Misconfigured Link Aggregation Group (LAG)

Figure 1:
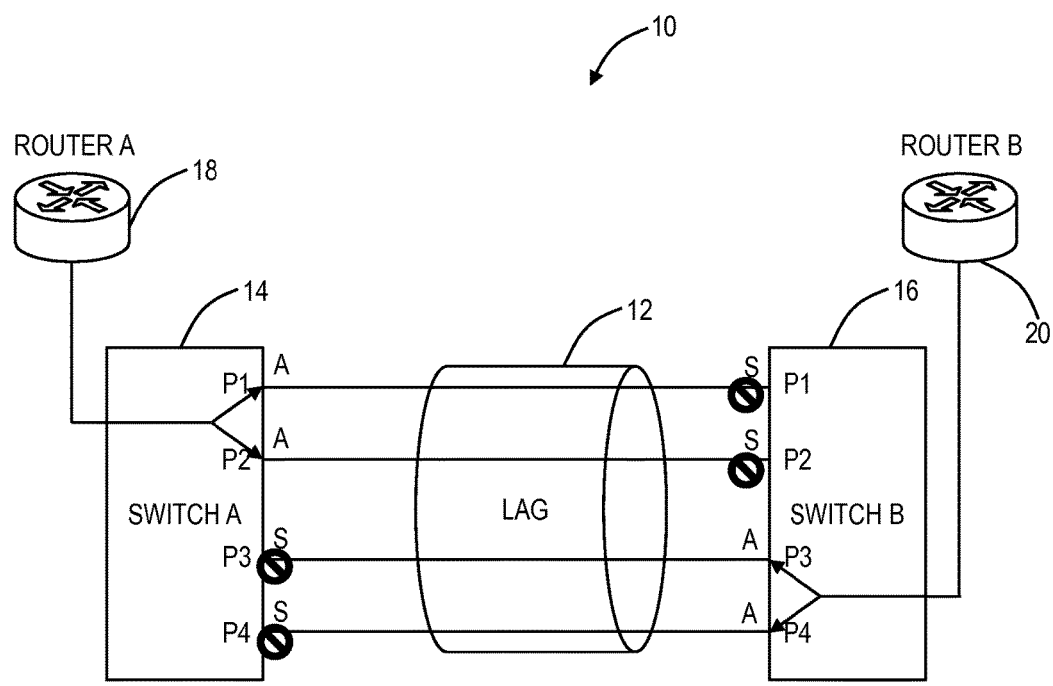
FIG. 1 is a network diagram of a network with a LAG configured between two switches with a misconfiguration in the LAG.

Referring to FIG. 1, in an exemplary embodiment, a network diagram illustrates a network 10 with a LAG 12 configured between two switches 14, 16 with a misconfiguration in the LAG 12. A router A 18 is communicatively coupled to a router B 20 via the LAG. The two switches 14, 16 are Layer-2 devices, such as packet switches, multi-service switches, optical cross connects, Packet-Optical Transport Systems (POTS), and the like. Each of the switches 14, 16 includes four ports, P1, P2, P3, P4, i.e., P{n} where n is a port number, n=1, 2, 3, 4. Each of the four ports, P1, P2, P3, P4 is either an Active Port (A) or a Standby Port (S). The following terminology will be used. A preferred port is a port that is preferred by the user to carry data traffic in a normal situation. A standby port is a port that is configured by the user as a backup port, i.e., in case of link failure it shall carry data traffic. An active port is a port on which data traffic transmission and reception are actually taking place.

Again, in Layer-2 networks, such as the network 10, the LAG 12 provides load sharing and a standby mechanism. With the switches 14, 16 communicating with one another, the user might land in a misconfigured LAG active and standby port configuration. FIG. 1 depicts a reference switch deployment with misconfigured active and standby ports. Specifically, ports P1, P2 of the switch 14 are not in a distributing state, i.e., Actor_sync=True; Collection=FALSE; Distribution=FALSE, of the LACP, and ports P3, P4 of the switch 14 are in a waiting state, i.e., Actor_sync=FALSE; Collection=FALSE; Distribution=False, of the LACP.

In the network 10, the user has the LAG 12 misconfigured with non-matched active and standby ports at both Layer 2 switches 14, 16. This results in the LAG 12 going down (as per IEEE 802.3ad standard) and it is not able to carry traffic. In another situation, if the switch 14 has two active ports without knowing that the switch 16 has one active and one standby port, this would lead to unnecessary traffic loss in one direction, from the switch 14 to the switch 16. Here the user has to decide, before configuring, which port to add as standby and which as active. Also the user has to know the end-to-end connectivity.

Misconfigured Multi-Chassis Link Aggregation Group (MC-LAG)

Figure 2:
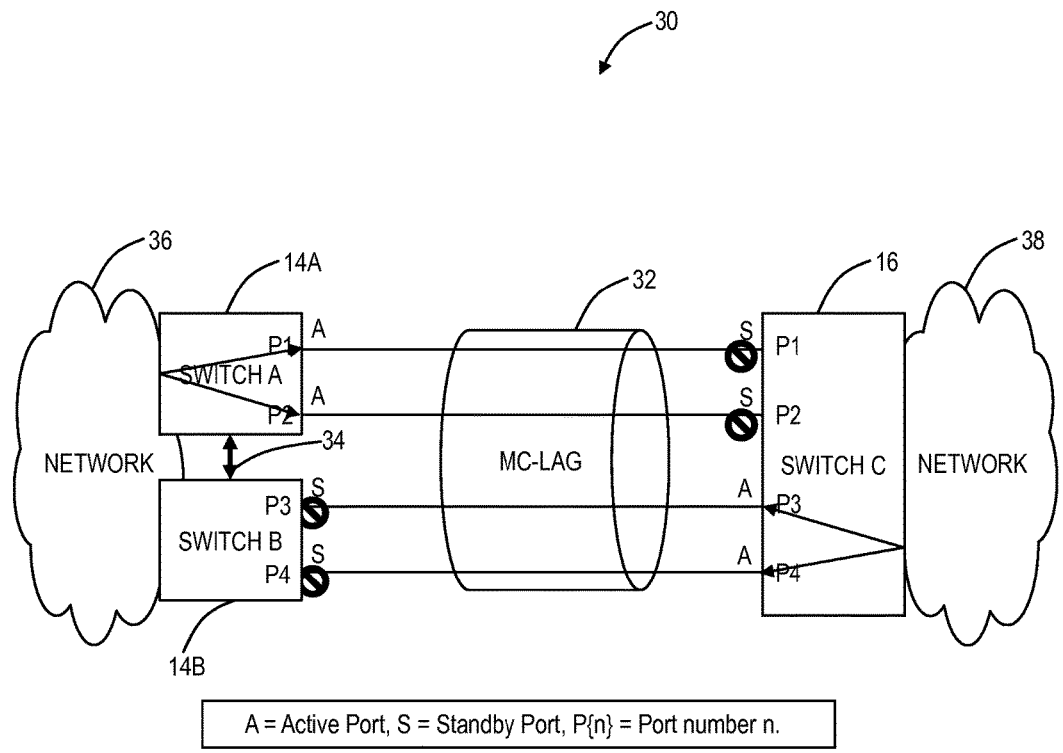
FIG. 2 is a network diagram of a network with a Multi-chassis LAG (MC-LAG) configured between three switches with a misconfiguration in the MC-LAG.

Referring to FIG. 2, in an exemplary embodiment, a network diagram illustrates a network 30 with a Multi-chassis LAG (MC-LAG) 32 configured between three switches 14A, 14B, 16 with a misconfiguration in the MC-LAG 32. The MC-LAG 32 provides equipment protection and load sharing in dual-homed topologies. Here, the switch 14, from the network 10 and the LAG 12, is split into two switches 14A, 14B which are in a multi-chassis configuration, with an inter-chassis communication 34 between the switches 14A, 14B. The switches 14A, 14B are connected to a network 36 and the switch 16 is connected to a network 38. In the MC-LAG 32, the switch 14A has the ports P1, P2 while the switch 14B has the ports P3, P4. The switch 16 has all the ports P1, P2, P3, P4. FIG. 2 is an example of a misconfiguration scenario in the MC-LAG 32.

Automated Selection of Active and Standby Ports

Figure 3:
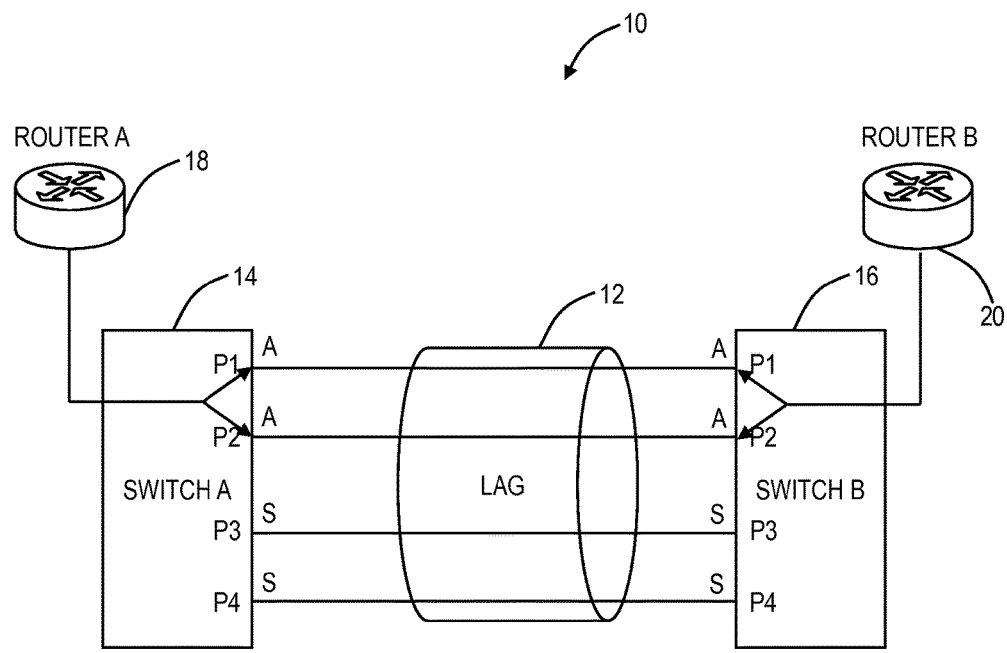
FIG. 3 is a network diagram of the network of FIG. 1 implementing the methods and systems to select active and protection ports in the LAG.

Referring to FIG. 3, in an exemplary embodiment, a network diagram illustrates the network 10 implementing the methods and systems to select active and protection ports in the LAG 12. The methods and system provide automation of the selection mechanism of active and stand-by ports (on the LAG 12 and the MC-LAG 32) with minimum user intervention (i.e., one-touch or one-click provisioning) and saving the manual labor and error prone task of specifying which ports need to be active and standby. Advantageously, the methods and systems overcome the misconfigurations described above and enable transmission of data traffic across higher priority ports that are part of link aggregation. The methods and systems can operate in two different modes of operation that are detailed below, and the user can select either mode. The first mode can include the user or network administrator specifying the number of preferred ports that are required for the LAG 12 or the MC-LAG 32, and the ports are automatically selected as Active to carry traffic or as Standby. The second mode can include the user or network administrator specifying the preferred and standby links that are required for the LAG 12 or the MC-LAG 32, and the ports are automatically selected as Active to carry traffic or as Standby based thereon.

Automatic Selection with LACP

The following definitions are used herein:

| | |
|---|---|
| ATTACH STATE | In this state, an LACP control frame transmit and receive (Tx/Rx) takes place for performing negotiation to select Active and Standby ports |
| COLLECTING STATE | This state indicates that a port is ready to receive data frames |
| DISTRIBUTING STATE | This state indicates that a port is ready to transmit data frames |
| Actor | It is the entity (Layer-2 switch/port) with respect to frame of reference of where the user resides |
| Partner | The far end entity (Layer-2 switch/port) of the actor |
| Actor_System_Id | It is a unique identifier (ID) of a globally administered Media Access Control (MAC) address for the actor system |
| Partner_System_Id | It is a unique globally administered MAC for the partner system |
| Actor_Sync | It is port level bit, which shows that a port has attached to the correct Link Aggregation and is ready for receiving and transmitting frames in following condition: If the value is TRUE, then the port would be ready to collect data frames and can be moved to the COLLECTING STATE, If the value is FALSE, then the port would remain in the ATTACH state. |

Figure 4:
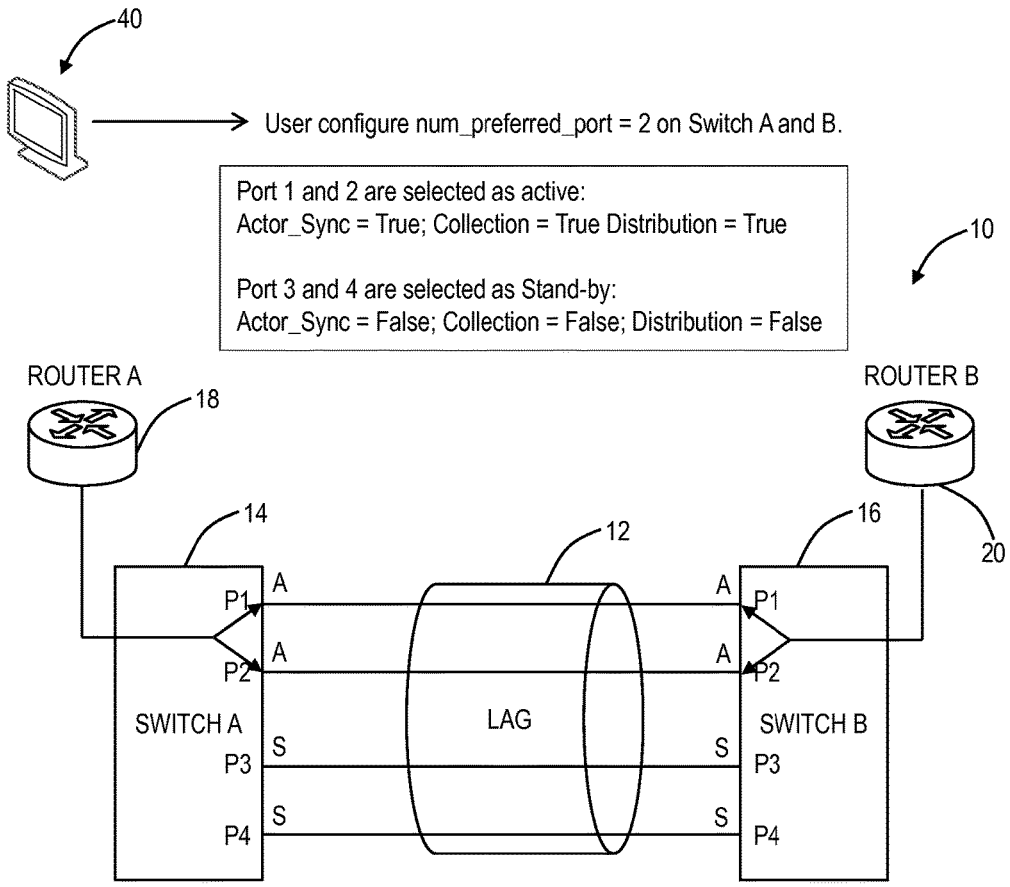
FIG. 4 is a network diagram of the network of FIG. 1 in an exemplary implementation of the methods and systems.

Referring to FIG. 4, in an exemplary embodiment, a network diagram illustrates the network 10 in an exemplary implementation of the methods and systems. Specifically, FIG. 4 describes how, based on a user 40 configuring a number of preferred ports needed in the LAG 12 or specifying the preferred and standby links, the methods and systems select active ports to avoid traffic hits due to misconfiguration. In this example, the user 40 specifies the number of preferred ports, num_preferred_ports, as 2 for each of the switches 14, 16. Note, the user 40 can make this one-click or one-touch provisioning through a Network Management System (NMS), Element Management System (EMS), Craft Interface (CI), Software Defined Networking (SDN) controller or the like. After the num_preferred_ports is provided as 2, the methods and systems automatically provision, e.g., using the LACP. For example, ports P1, P2 are selected as active, Actor_Sync=True; Collection=True Distribution=True; and ports P3, P4 are selected as standby, Actor_Sync=False; Collection=False; Distribution=False.

Figure 5:
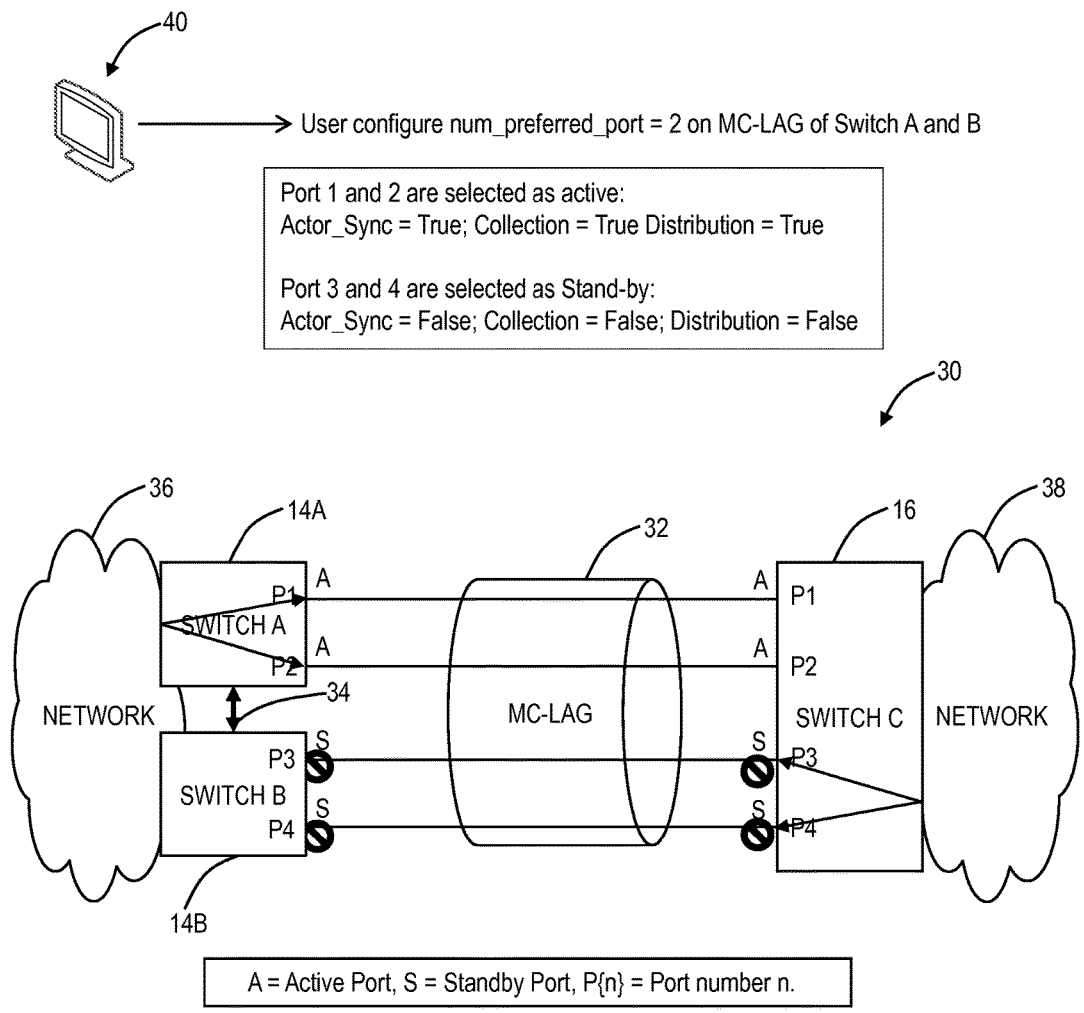
FIG. 5 is a network diagram of the network of FIG. 2 in an exemplary implementation of the methods and systems.

Referring to FIG. 5, in an exemplary embodiment, a network diagram illustrates the network 30 in an exemplary implementation of the methods and systems. FIG. 5 is similar to FIG. 4, but illustrating the MC-LAG 30. Again, similar to FIG. 4, in FIG. 5, the user specifies the number of preferred ports, num_preferred_ports, as 2 for each of the switches 14, 16. After the num_preferred_ports is provided as 2, the methods and systems automatically provision, e.g., using the LACP. For example, ports P1, P2 are selected as active, Actor_Sync=True; Collection=True Distribution=True; and ports P3, P4 are selected as standby, Actor_Sync=False; Collection=False; Distribution=False.

In an exemplary embodiment, after the user 40 adds the port to the LAG 12, 32, each and every port in the LAG 12, 32 would go into ATTACH STATE and Actor-Sync bit is set as FALSE. The switch 14, 16 with a Higher System-Id is set as a Master switch and the other switch 14, 16 is set as a Slave switch. Note, any other technique is contemplated for selecting Master/Slave. For the MC-LAG 32, if any port goes down on any of the switches 14A, 14B, 16 of the MC-LAG 32, then the Actor_Sync bit of all ports on that switch 14A, 14B, 16 and part of MC-LAG 32 should be changed to FALSE and TRUE for all ports belonging to the other switch in the same MC-LAG 32. For example, a port on the switch 14A goes down, then the switch 14A will set Actor_Sync to FALSE on all of its ports and the switch 14V will set Actor_Sync to TRUE on all of its ports. This will enable protection switching for the MC-LAG 32. In the case where one side is the MC-LAG 32, and the far end is a normal LAG 12, then any one of the MC-LAG 32 switches 14A, 14B shall become master switch (its priority shall be set to high) so that it will perform the protection switch as mentioned above.

As specified above, the methods and systems support the following modes of operation:

Mode 1: The network administrator or the user 40 specifies the number of active ports (N); in this mode, the user 40 configures the number of active ports that are required in LAG group; and Mode 2: The active and standby ports are explicitly described, such as based on the links; in this mode, the required number of active ports (N) is determined by user configuration of active and standby ports.

The (N) value can be transmitted in the reserved bytes in a LACP PDU. Suppose this value is N on the master switch and M on the slave switch. The master switch will set Actor_sync bit as TRUE for MIN {N, M} higher priority ports and will send the same in next PDU. The partner port on the slave switch receives Actor_sync as TRUE, then it will move to the COLLECTING STATE, and it will send back COLLECTION bit as TRUE. This will trigger actor ports on the master switch to move to the DISTRIBUTION STATE. Similarly, the port on the slave switch will also move to distribution state.

Figure 6:
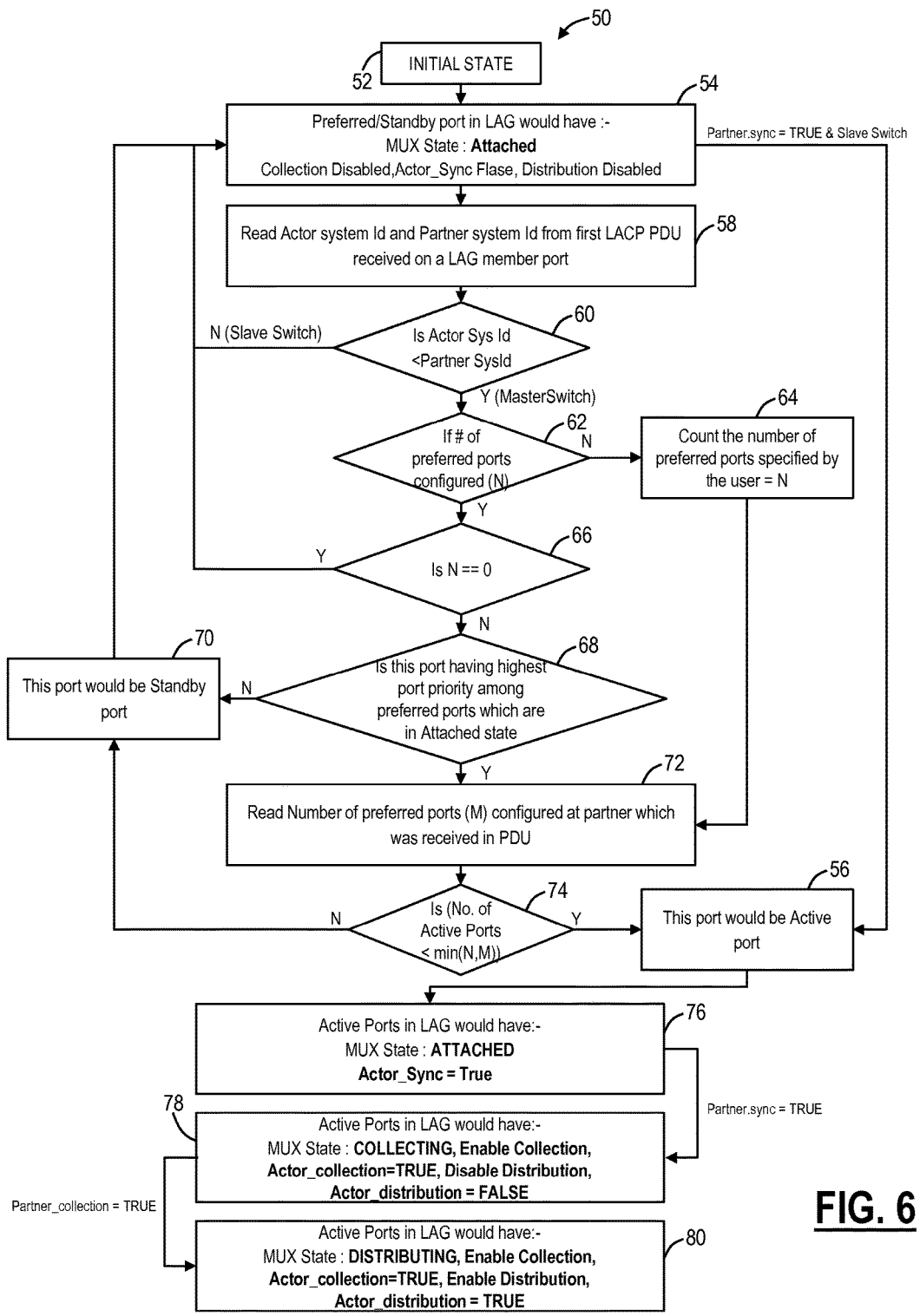
FIG. 6 is a flowchart of a process for automatic port selection.

Referring to FIG. 6, in an exemplary embodiment, a flowchart illustrates a process 50 for automatic port selection. The process 50 can be implemented through LACP for a port in the LAG 12 or the MC-LAG 32. Initially, the port, implementing the process 50, is in an INITIAL STATE (step 52). The Preferred/Standby port in the LAG 12, 32 would have its MUX State—ATTACHED, Collection DISABLED, Actor_Sync FALSE, Distribution DISABLED (step 54). If the port's Partner sync is set to TRUE and the port is on a slave switch, this port would be an active port (step 56). The process 50 includes reading the Actor_system_Id and the Partner_system_Id from the first LACP PDU received on a LAG member port (step 58). If the Actor_system_Id is not less than the Partner_system_Id (step 60), the switch is a slave switch, and the process returns to the step 54 until Partner sync is set to TRUE (step 54). If the Actor_system_Id is less than the Partner_system_Id (step 60), the switch is the master switch, and the process 50 checks if a number of preferred ports are (N) (step 62). If the number of preferred ports is not (N), the process 50 includes counting the number of preferred ports specified by the user, N (step 64).

If the number of configured preferred ports is (N) (step 62), the process 50 includes checking if N==0 (step 66) and if so, returns to the step 54. If not (step 66), the process 50 includes checking if this port has the highest port priority among preferred ports which are in ATTACHED state (step 68), and if not, this port would be a standby port (step 70); else, the process 50 includes reading a Number of preferred ports (M) configured at the partner which was received in the PDU (step 72). Note, step 72 is also performed subsequent to step 64 as well. After step 72, the process 50 includes checking if the number of active ports is less than the min(N, M) (step 74). If the number of active ports is greater than or equal to the min(N, M) (step 74), this port would be a standby port (step 70). If the number of active ports is less than the min(N, M) (step 74), the port would be an active port (step 56).

After step 56, the Active Ports in the LAG 12, 32 would have:—MUX State: ATTACHED and Actor_Sync=True (step 76). The partner sync is set to TRUE and the Active Ports in the LAG 12, 32 would have:—MUX State: COLLECTING, Enable Collection, Actor_collection=TRUE, DISABLE Distribution, Actor_distribution=FALSE (step 78). Finally, partner collection is set to TRUE, and the Active Ports in LAG 12, 32 would have:—MUX State: DISTRIBUTING, ENABLE Collection, Actor_collection=TRUE, ENABLE Distribution, Actor_distribution=TRUE (step 80).

Figure 7:
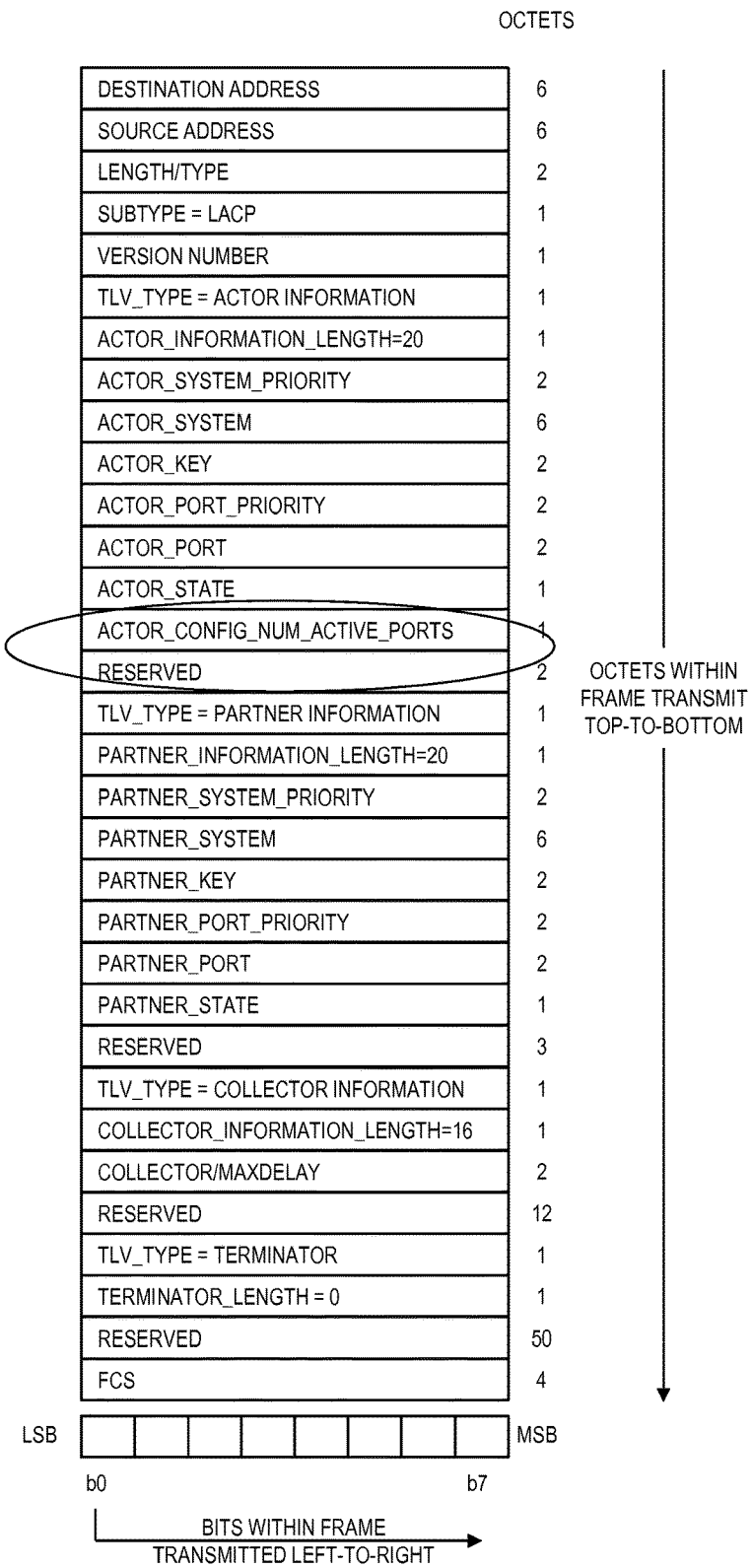
FIG. 7 is a block diagram of a modified LACP Protocol Data Unit (PDU) structure for use with the systems and methods.

Referring to FIG. 7, in an exemplary embodiment, a block diagram illustrates a modified LACP Protocol Data Unit (PDU) structure for use with the systems and methods. As described herein, reserved bytes in the LACP Protocol Data Unit (PDU) structure are utilized to propagate and determine the number of active member ports of Link aggregation.

Protection Switching

Figure 8:
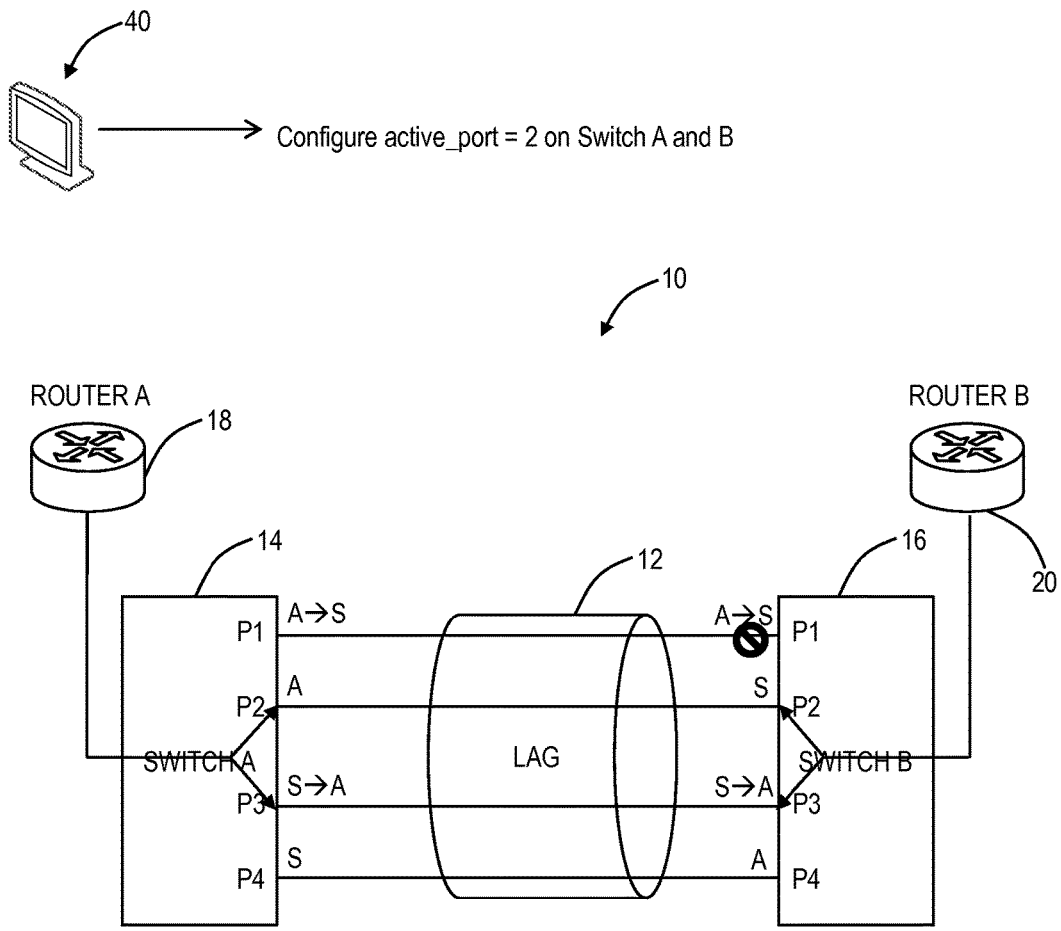
FIG. 8 is a network diagram of standby port switching in the network of FIG. 1 with a LAG.
Figure 9:
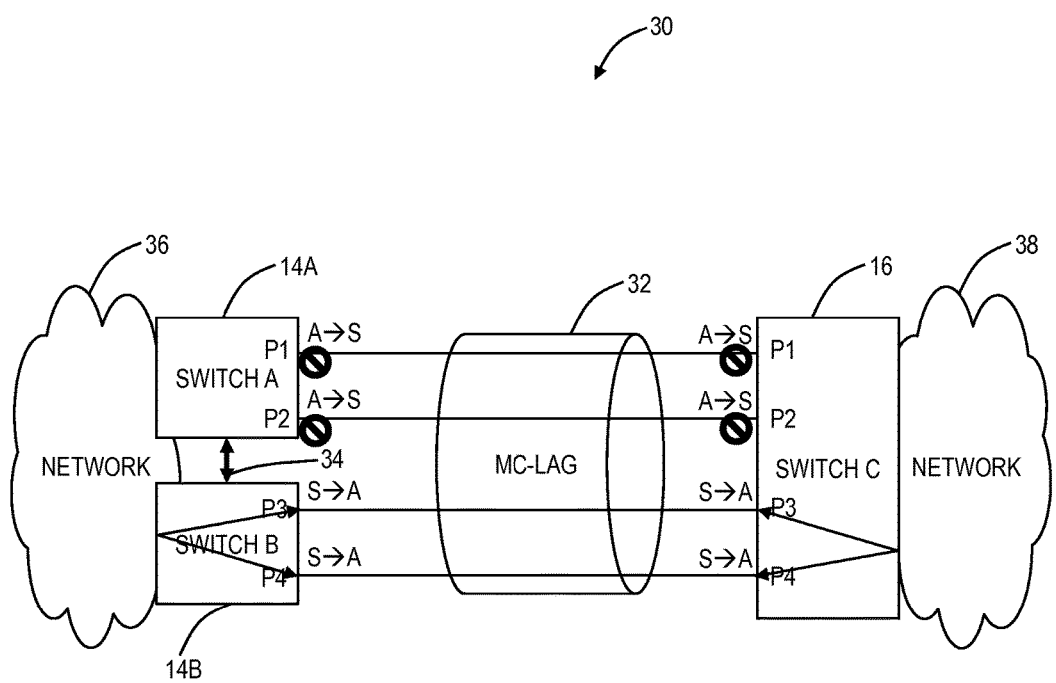
FIG. 9 is a network diagram of standby port switching in the network of FIG. 2 with a MC-LAG.

Referring to FIGS. 8 and 9, in an exemplary embodiment, network diagrams illustrate standby port switching in the network 10 with a LAG 12 (FIG. 8) and in the network 30 with the MC-LAG 32 (FIG. 9). In FIG. 8, the user 40 has configured active_port=2 on the switches 14, 16. The process 50 is used to set automatically the ports P1, P2 as active and the ports P3, P4 as standby. Now, in FIG. 8, assume there is a fault on the port P1, e.g., on the switch 16. The Actor_sync would be turned FALSE for that port. Now protection logic on the master switch would select the next higher priority link or the highest priority configured protection port to switch data traffic.

In this case, the port P3 would be selected to switch the data traffic. Thus, Actor_sync would be turned TRUE for the port P3 on the master switch. In this case, assume the switch 14 is the master switch, then following steps will lead to switching of data traffic:

1. The port P3 of the switch 14 would have Actor_sync=TRUE, and transmit the same in the LACP PDU;
2. The port P3 of the switch 16 receives this PDU, and it will move to the COLLECTING STATE and mark its own Actor_sync=TRUE, and send the same in next LACP PDU;
3. As soon as the port P3 of the switch 14 receives the LACP PDU with partner collection=TRUE, it will be moved to the COLLECTING STATE and then to the DISTRIBUTING STATE with actor_distribution=TRUE; and
4. When the port P3 of the switch 16 receives partner collection=TRUE, then it will move its port to the DISTRIBUTING STATE.

In FIG. 8, the MC-LAG 32 is shown with faults on both the ports P1, P2. After the port fault on the active ports P1, P2, the algorithm changes the actor_sync bit=FALSE for the ports P1, P2. Thus, Protection logic will set Actor_Sync=TRUE on the port P3, P4 on the Master switch. Thus ports P3, P4 will move to collection and then distribution.

Figure 10:
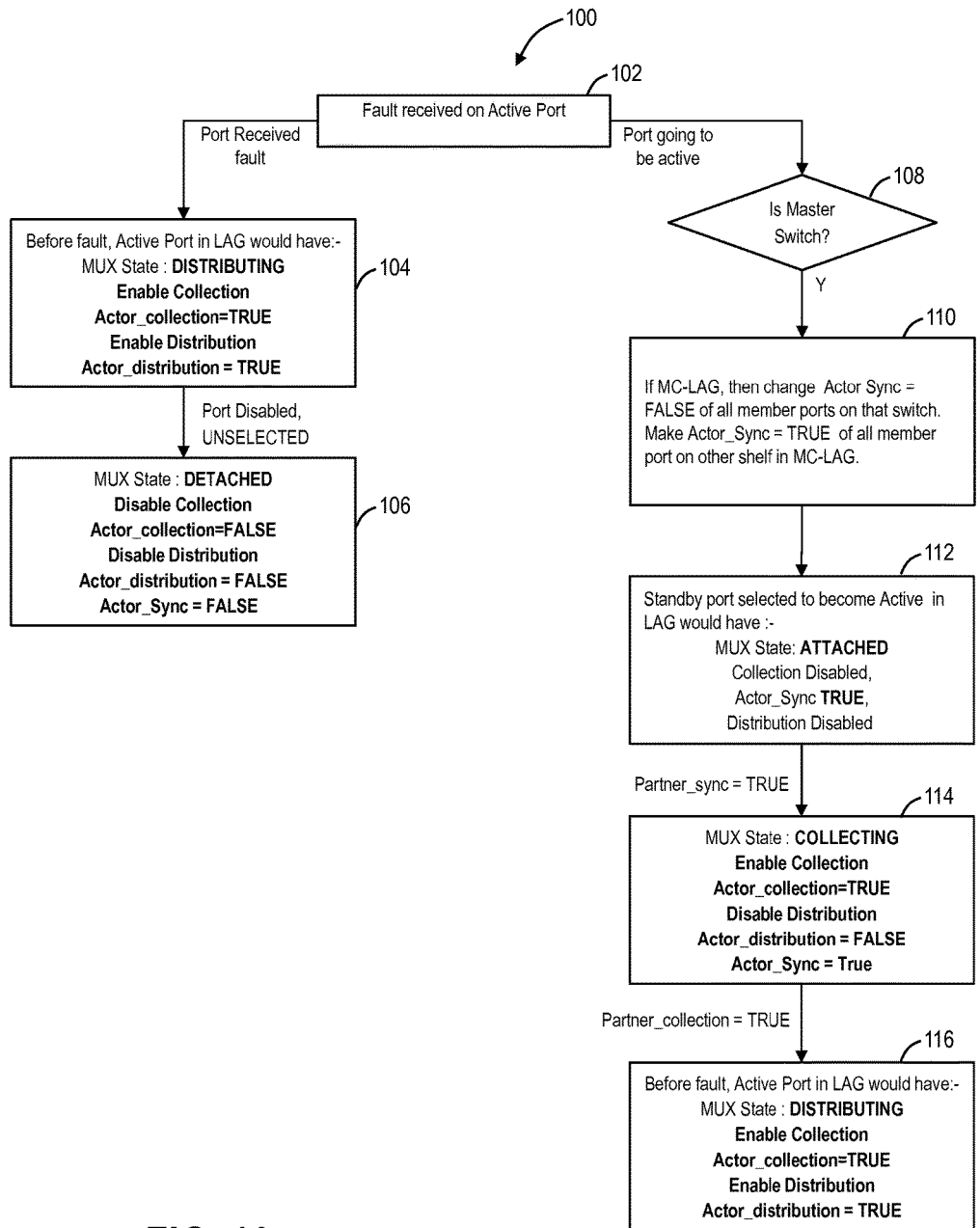
FIG. 10 is a flowchart of a process for standby port selection after a fault on an active port.

Referring to FIG. 10, in an exemplary embodiment, a flowchart illustrates a process 100 for standby port selection after a fault on an active port. A fault is received on an active port (step 102). On the port receiving the fault, before the fault, the Active Port in the LAG 12, 32 would have:—MUX State: DISTRIBUTING, ENABLE Collection, Actor_collection=TRUE, ENABLE Distribution, Actor_distribution=TRUE (step 104). The port with the fault is disabled and UNSELECTED, and the MUX State is DETACHED, DISABLE Collection, Actor_collection=FALSE, DISABLE Distribution, Actor_distribution=FALSE, and Actor_Sync=FALSE (step 106).

For the port that is going to become active responsive to the fault, if the switch is the master switch (step 108), if this is the MC-LAG 32, then change Actor_Sync=FALSE on all member ports on that switch and make Actor_Sync=TRUE on all member port on the other shelf in the MC-LAG 32 (step 110). For the standby port selected to become Active in the LAG 12, 32, the following are set:—MUX State: ATTACHED, Collection DISABLED, Actor_Sync TRUE, and Distribution DISABLED (step 112). The partner sync is set to TRUE and then MUX State: COLLECTING, ENABLE Collection, Actor_collection=TRUE, DISABLE Distribution, Actor_distribution=FALSE, and Actor_Sync=TRUE (step 114). The partner collection is set to TRUE, and before the fault, the Active Port in the LAG 12, 32 would have:—MUX State: DISTRIBUTING, ENABLE Collection, Actor_collection=TRUE, ENABLE Distribution, and Actor_distribution=TRUE (step 116).

Fault Restoration

Figure 11:
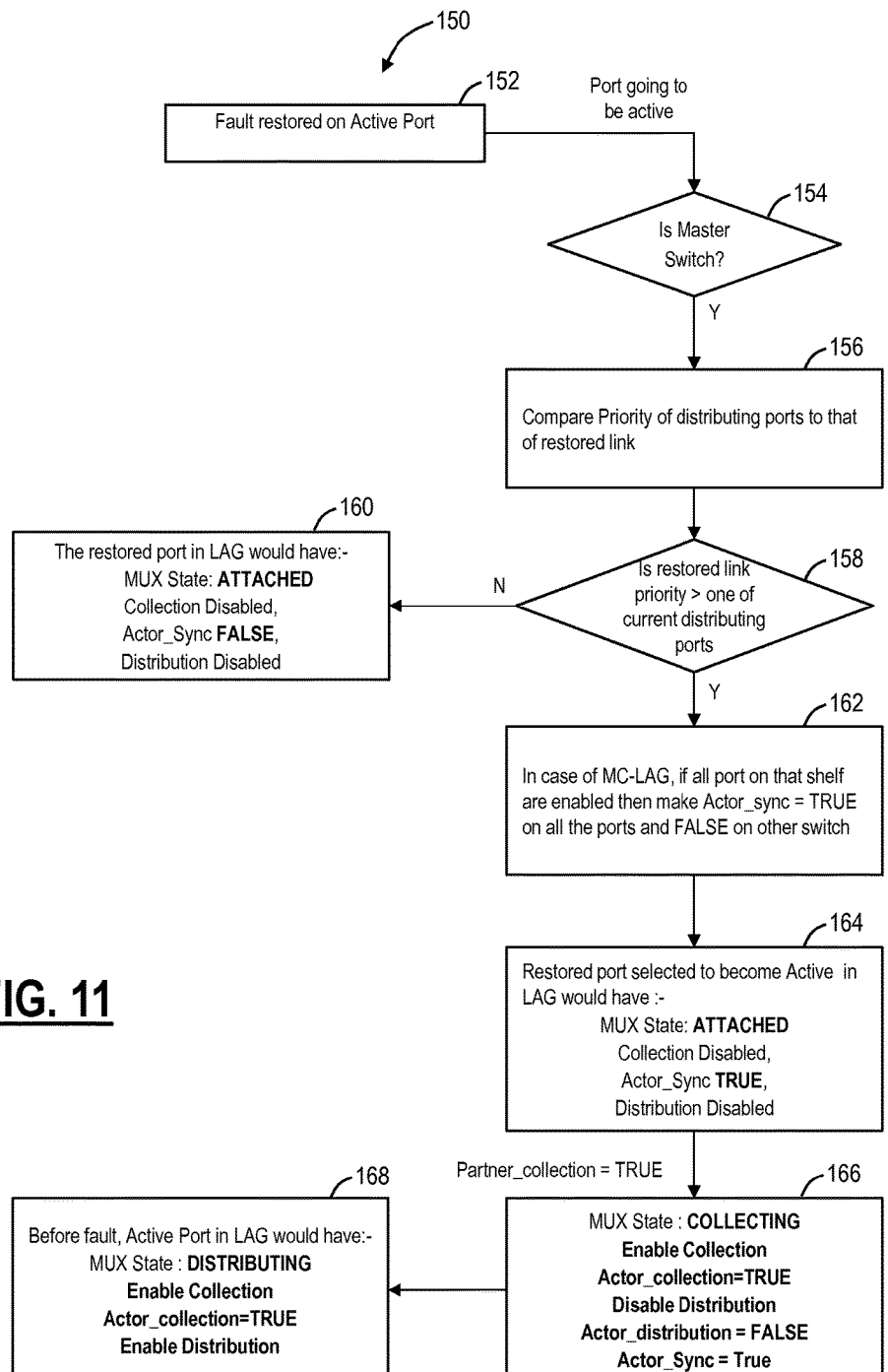
FIG. 11 is a flowchart of a process for fault restoration on active ports.

Referring to FIG. 11, in an exemplary embodiment, a flowchart illustrates a process 150 for fault restoration on active ports. When a faulty link is restored, then its priority is compared to the existing distributed links. If the restored link has higher priority than any one of the distributing ports, then the port with the lowest priority among the distributing ports would be removed from distributing, and the restored link would take its place. The removed ports would set its Actor_Sync as FALSE and move to ATTACH state, and the restored link would move to DISTRIBUTING state. The user 40 will also have a choice whether he/she wants to consider moving the restored link to DISTRIBUTING state or keep the link in the ATTACH state with Actor_Sync as FALSE and continue to load balance on existing active ports.

The process 150, subsequent to a fault being restored on the Active port (step 152), for the port that is going to be active, the process 150 includes checking if this is the Master switch (step 154). If this is the Master switch (step 154), the priority is compared between the restored port/link and the current distributing ports (step 156). If the restored link priority is not greater than one of the current distributing ports (step 158), the restored port in LAG would have:—MUX State: ATTACHED, Collection DISABLED, Actor_Sync FALSE, and Distribution DISABLED (step 160). If the restored link priority is greater than one of the current distributing ports (step 158), in case of the MC-LAG 32, if all ports on that shelf are enabled, then make Actor_sync=TRUE on all the ports and FALSE on the other switch (step 162).

The restored port selected to become Active in the LAG 12, 32 would have:—MUX State: ATTACHED, Collection DISABLED, Actor_Sync TRUE, and Distribution DIS- ABLED (step 164). The partner collection is set to TRUE, and the MUX State: COLLECTING, ENABLE Collection, Actor_collection=TRUE, DISABLE Distribution, Actor_distribution=FALSE, and Actor_Sync=True (step 166). Partner sync is set to TRUE, and before the fault, Active Port in LAG would have:—MUX State: DISTRIBUTING, ENABLE Collection, Actor_collection=TRUE, and Enable Distribution (step 168).

Figure 12:
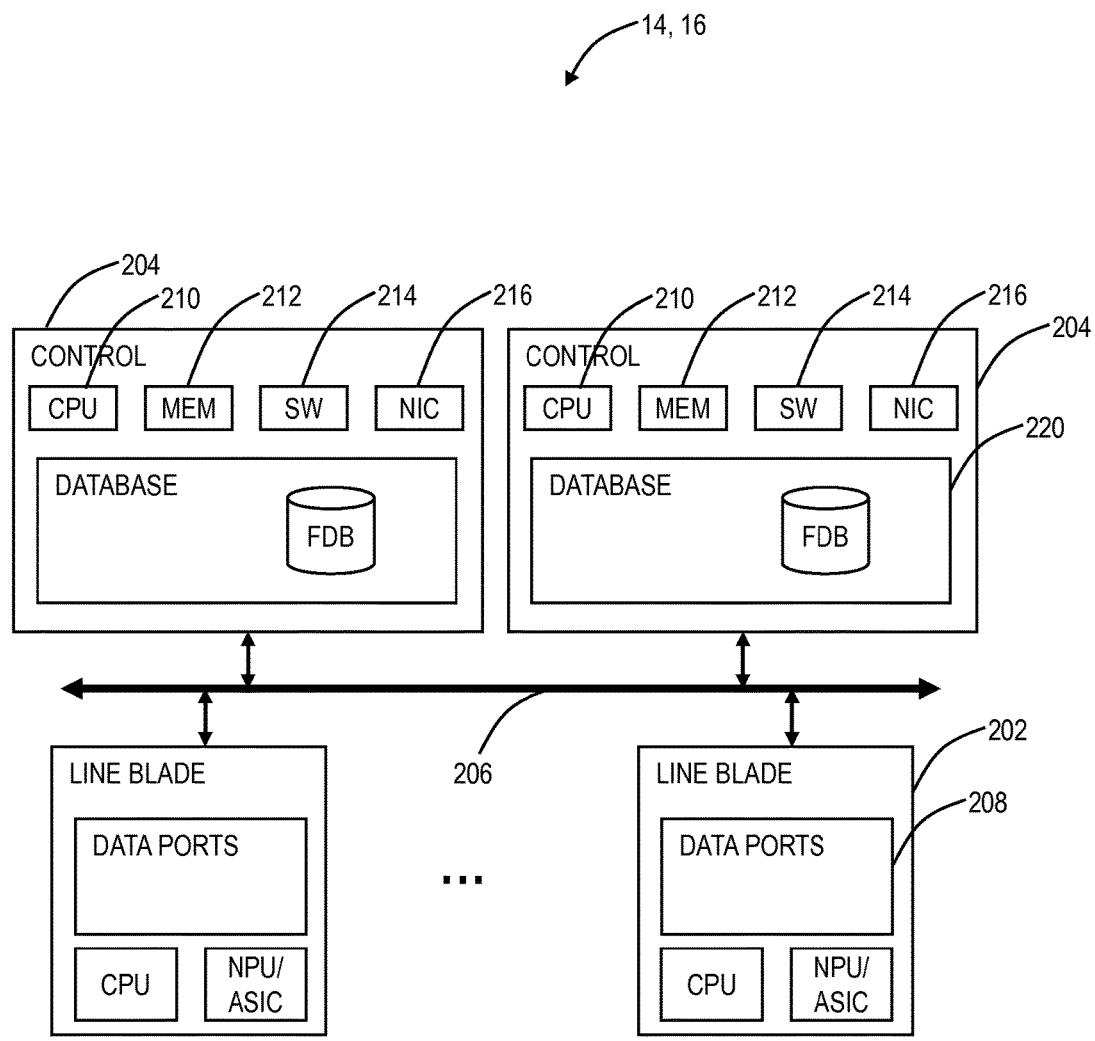
FIG. 12 is a block diagram of an exemplary implementation of a node.

Referring to FIG. 12, in an exemplary embodiment, a block diagram illustrates an exemplary implementation of a switch 14, 16. In this exemplary embodiment, the switch 14, 16 is an Ethernet network switch, but those of ordinary skill in the art will recognize the systems and methods described herein contemplate other types of network elements and other implementations. In this exemplary embodiment, the switch 14, 16 includes a plurality of blades 202, 204 interconnected via an interface 206. The blades 202, 204 are also known as line cards, line modules, circuit packs, pluggable modules, etc. and refer generally to components mounted on a chassis, shelf, etc. of a data switching device, i.e., the switch 14, 16. Each of the blades 202, 204 can include numerous electronic devices and optical devices mounted on a circuit board along with various interconnects including interfaces to the chassis, shelf, etc.

Two exemplary blades are illustrated with line blades 202 and control blades 204. The line blades 202 include data ports 208 such as a plurality of Ethernet ports. For example, the line blade 202 can include a plurality of physical ports disposed on an exterior of the blade 202 for receiving ingress/egress connections. Additionally, the line blades 202 can include switching components to form a switching fabric via the interface 206 between all of the data ports 208 allowing data traffic to be switched between the data ports 208 on the various line blades 202. The switching fabric is a combination of hardware, software, firmware, etc. that moves data coming into the switch 14, 16 out by the correct port 208 to the next switch 14, 16. "Switching fabric" includes switching units, or individual boxes, in a node; integrated circuits contained in the switching units; and programming that allows switching paths to be controlled. Note, the switching fabric can be distributed on the blades 202, 2104, in a separate blade (not shown), or a combination thereof. The line blades 202 can include an Ethernet manager (i.e., a processor) and a network processor (NP)/application specific integrated circuit (ASIC).

The control blades 104 include a microprocessor 210, memory 212, software 214, and a network interface 216. Specifically, the microprocessor 210, the memory 212, and the software 214 can collectively control, configure, provision, monitor, etc. the switch 14, 16. The network interface 216 may be utilized to communicate with an element manager, a network management system, etc. Additionally, the control blades 204 can include a database 220 that tracks and maintains provisioning, configuration, operational data and the like. The database 220 can include a forwarding database (FDB) that may be populated as described herein (e.g., via the user triggered approach or the asynchronous approach). In this exemplary embodiment, the switch 14, 16 includes two control blades 204 which may operate in a redundant or protected configuration such as 1:1, 1+1, etc. In general, the control blades 204 maintain dynamic system information including Layer two forwarding databases, protocol state machines, and the operational status of the ports 108 within the switch 14, 16.

Figure 13:
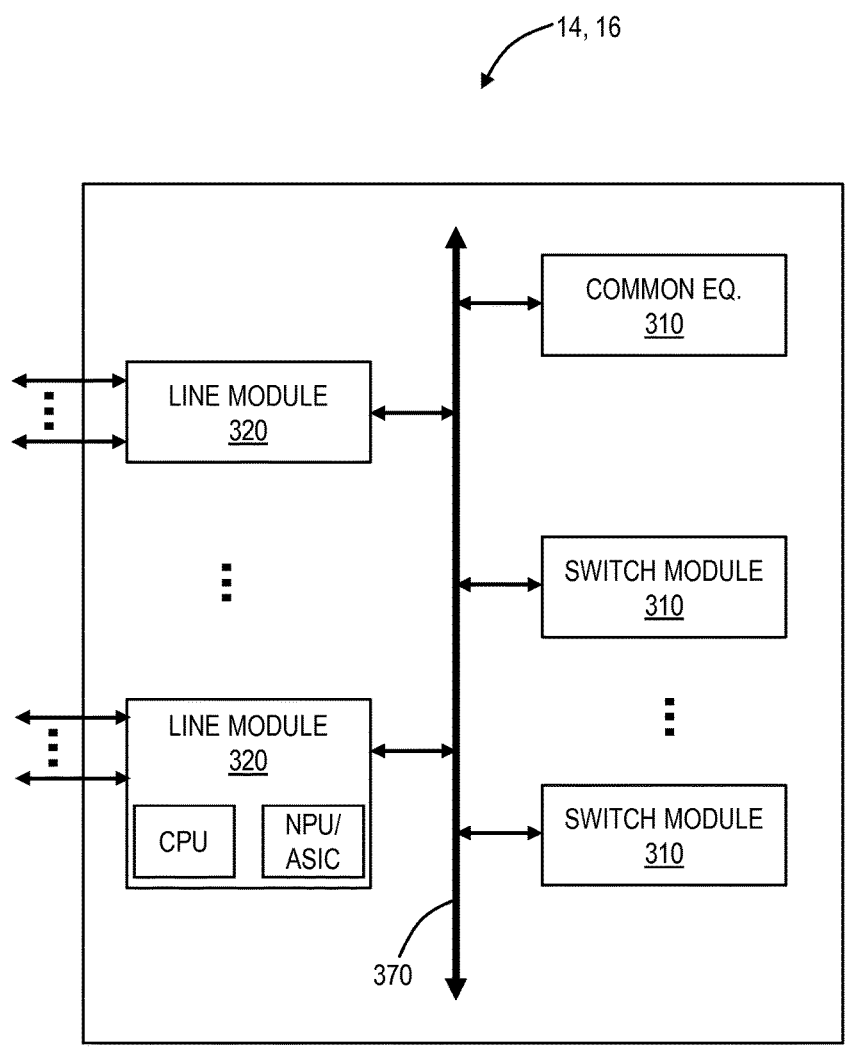
FIG. 13 is a block diagram of another exemplary implementation of a node.

Referring to FIG. 13, in an exemplary embodiment, a block diagram illustrates another exemplary implementation of the switch 14, 16. For example, FIG. 12 can be a dedicated Ethernet switch whereas FIG. 13 can be a multi-service platform. In an exemplary embodiment, the switch 14, 16 can be a nodal device that may consolidate the functionality of a multi-service provisioning platform (MSPP), digital cross connect (DCS), Ethernet and Optical Transport Network (OTN) switch, dense wave division multiplexed (DWDM) platform, etc. into a single, high-capacity intelligent switching system providing Layer 0, 1, and 2 consolidation. In another exemplary embodiment, the switch 14, 16 can be any of an add/drop multiplexer (ADM), a multi-service provisioning platform (MSPP), a digital cross-connect (DCS), an optical cross-connect, an optical switch, a router, a switch, a WDM terminal, an access/aggregation device, etc. That is, the switch 14, 16 can be any system with ingress and egress signals and switching of packets, channels, time slots, tributary units, wavelengths, etc.

In an exemplary embodiment, the switch 14, 16 includes common equipment 310, one or more line modules 320, and one or more switch modules 330. The common equipment 310 can include power; a control module; operations, administration, maintenance, and provisioning (OAM&P) access; and the like. The common equipment 310 can connect to a management system such as a network management system (NMS), element management system (EMS), or the like. The switch 14, 16 can include an interface 370 for communicatively coupling the common equipment 310, the line modules 320, and the switch modules 330 together. For example, the interface 370 can be a backplane, midplane, a bus, optical or electrical connectors, or the like. The line modules 320 are configured to provide ingress and egress to the switch modules 330 and external to the switch 14, 16. In an exemplary embodiment, the line modules 320 can form ingress and egress switches with the switch modules 330 as center stage switches for a three-stage switch, e.g., a three-stage Clos switch.

The line modules 320 can include a plurality of connections per module and each module may include a flexible rate and protocol support for any type of connection, such as, for example, 155 Mb/s, 622 Mb/s, 1 Gb/s, 2.5 Gb/s, 10 Gb/s, 40 Gb/s, 100 Gb/s, etc. The line modules 320 can include wavelength division multiplexing interfaces, short reach interfaces, and the like, and can connect to other line modules 320 on remote network elements, end clients, routers, switches, and the like. From a logical perspective, the line modules 320 provide ingress and egress ports to the switch 14, 16, and each line module 320 can include one or more physical ports. The switch modules 330 are configured to switch channels, timeslots, tributary units, wavelengths, etc. between the line modules 320. For example, the switch modules 330 can provide wavelength granularity (Layer 0 switching), OTN granularity such as Optical Channel Data Unit-k (ODUk) Optical Channel Data Unit-flex (ODUflex), Optical channel Payload Virtual Containers (OPVCs), etc.; Ethernet granularity; and the like. Specifically, the switch modules 230 can include both Time Division Multiplexed (TDM) (i.e., circuit switching) and packet switching engines. The switch modules 230 can include redundancy as well, such as 1:1, 1:N, etc.

Those of ordinary skill in the art will recognize the nodes in FIGS. 12 and 13 can include other components that are omitted for illustration purposes, and that the systems and methods described herein are contemplated for use with a plurality of different nodes with the nodes in FIGS. 12 and 13 presented as an exemplary type of switch. For example, in another exemplary embodiment, a node may not include the switch modules 330, but rather have the corresponding functionality in the line modules 320 (or some equivalent) in a distributed fashion. For the nodes in FIGS. 12 and 13, other architectures providing ingress, egress, and switching are also contemplated for the systems and methods described herein. In general, the systems and methods described herein contemplate use with any node providing the LAG 12 or the MC-LAG 32.

Further, it will be appreciated that some exemplary embodiments described herein may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the aforementioned approaches may be used. Moreover, some exemplary embodiments may be implemented as a non-transitory computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method for automatically selecting active ports and standby ports in a Link Aggregation Group (LAG) or a Multi-Chassis LAG (MC-LAG) between a first node and a second node, the method comprising:
   receiving a configuration associated with the LAG or the MC-LAG based on one-touch or one-click provisioning from a user;
   automatically determining a port status for each of a plurality of ports based on the configuration, wherein the configuration comprises one of (i) a specification of a number of preferred ports for the plurality of ports and (ii) a specification of preferred links and standby links, and wherein the automatically determining is performed locally based on the one of (i) and (ii);
   configuring the plurality of ports based on the automatically determined port status; and
   communicating the determined port status for each of the plurality of ports between the first node and the second node using reserved bytes in a Protocol Data Unit (PDU) from Link Aggregation Control Protocol (LACP) for configuring the second node.

2. The method of claim 1, wherein the automatically determining assigns an active status and a standby status to each of the plurality of ports based on the configuration, wherein one of the first node and the second node are determined as a master node which performs the automatically determining and communicates to a slave node.

3. The method of claim 1, wherein the communicating utilizes a state machine in which the first node and the second node communicate associated port states for each of the plurality of ports.

4. The method of claim 1, wherein the communicating ensures each pair of ports of the plurality of ports is in a same state.

5. The method of claim 1, further comprising:
   responsive to a fault on an active port of the plurality of ports, selecting another port by a master switch to switch traffic to from the active port; and
   communicating an update of status of the another port to a slave switch.

6. The method of claim 5, further comprising:
   responsive to the fault being restored, reverting to the active port and communicating an update of status of the active port to the slave switch.

7. A switch configured to automatically select active ports and standby ports in a Link Aggregation Group (LAG) or a Multi-Chassis LAG (MC-LAG) between a second switch and the switch, the switch comprising:
   a plurality of ports;
   circuitry configured to, responsive to receipt of a configuration associated with the LAG or the MC-LAG based on one-touch or one-click provisioning from a user, automatically determine a port status for each of a plurality of ports based on the configuration, wherein the configuration comprises one of (i) a specification of a number of preferred ports for the plurality of ports and (ii) a specification of preferred links and standby links, and wherein the port status is automatically determined locally based on the one of (i) and (ii);
   circuitry configured to provision the plurality of ports based on the automatically determined port status; and
   circuitry configured to communicate the determined port status for each of the plurality of ports between the switch and the second switch using reserved bytes in a Protocol Data Unit (PDU) from Link Aggregation Control Protocol (LACP) to configure the second node.

8. The switch of claim 7, wherein the circuitry configured to automatically determine assigns an active status and a standby status to each of the plurality of ports based on the configuration, wherein the switch is a master node which determines the active status and the standby status and communicates with a slave node which is the second switch.

9. The switch of claim 7, wherein the circuitry configured to communicate utilizes a state machine in which the switch communicate associated port states for each of the plurality of ports to the second switch.

10. The switch of claim 7, wherein the circuitry configured to communicate ensures each pair of ports of the plurality of ports are in a same state at both the switch and the second switch.

11. The switch of claim 7, further comprising:
circuitry configured to, responsive to a fault on an active port of the plurality of ports, select another port by a master switch to switch traffic to from the active port;
wherein the circuitry configured to communicate is configured to an update of status of the another port to a slave switch.

12. The switch of claim 11, wherein, the circuitry configured to select another port is configured to, responsive to the fault being restored, revert to the active port and communicating an update of status of the active port to the slave switch.

13. A network in which active ports and standby ports in a Link Aggregation Group (LAG) or a Multi-Chassis LAG (MC-LAG) are automatically configured between switches, the network comprising:
a first switch comprising a first plurality of ports;
a second switch comprising a second plurality of ports communicatively coupled to the first plurality of ports;
wherein one of the LAG and the MC-LAG is configured over the first plurality of ports and the second plurality of ports;
wherein one of the first switch and the second switch is a master switch that comprises:
circuitry configured to, responsive to receipt of a configuration associated with the LAG or the MC-LAG based on one-touch or one-click provisioning from a user, automatically determine a port status for each of port based on the configuration, wherein the configuration comprises one of (i) a specification of a number of preferred ports for each of the first plurality of ports and the second plurality of ports and (ii) a specification of preferred links and standby links, and wherein the port status is automatically determined locally based on the one of (i) and (ii);
circuitry configured to provision the plurality of ports based on the automatically determined port status; and
circuitry configured to communicate the determined port status to a slave switch using reserved bytes in a Protocol Data Unit (PDU) from Link Aggregation Control Protocol (LACP) to configure the slave switch.

* * * * *